United States Patent
Cheng et al.

(10) Patent No.: US 9,706,033 B2
(45) Date of Patent: Jul. 11, 2017

(54) DISPLAY METHOD AND DEVICE FOR MOBILE TERMINAL

(71) Applicant: ZTE CORPORATION, Shenzhen, Guangdong Province (CN)

(72) Inventors: Xiaofeng Cheng, Shenzhen (CN); Zuyong Shi, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/431,467

(22) PCT Filed: Jun. 26, 2013

(86) PCT No.: PCT/CN2013/077976
§ 371 (c)(1),
(2) Date: Mar. 26, 2015

(87) PCT Pub. No.: WO2013/182094
PCT Pub. Date: Dec. 12, 2013

(65) Prior Publication Data
US 2015/0249732 A1 Sep. 3, 2015

(30) Foreign Application Priority Data
Sep. 28, 2012 (CN) .......................... 2012 1 0367977

(51) Int. Cl.
*H04W 4/00* (2009.01)
*H04M 1/725* (2006.01)
(Continued)

(52) U.S. Cl.
CPC ....... *H04M 1/72519* (2013.01); *H04W 24/08* (2013.01); *H04M 2250/06* (2013.01); *H04W 84/12* (2013.01)

(58) Field of Classification Search
CPC .............................. H04W 24/00; H04L 63/08
(Continued)

(56) References Cited

U.S. PATENT DOCUMENTS

2004/0043766 A1* 3/2004 Sashihara ............... H04L 63/08
455/432.1
2013/0227120 A1* 8/2013 Yu ......................... H04W 24/00
709/224

FOREIGN PATENT DOCUMENTS

CN    101499962 A    8/2009
CN    102970769 A    3/2013
(Continued)

OTHER PUBLICATIONS

English Abstract translation of CN101499962 (Published Aug. 5, 2009).
(Continued)

*Primary Examiner* — William D Cumming
(74) *Attorney, Agent, or Firm* — McClure, Qualey & Rodack, LLP

(57) ABSTRACT

A display method and apparatus for a mobile terminal are disclosed. In the method, traffic display identifiers are set corresponding to different wireless local area network traffic conditions of the mobile terminal, and a traffic display identifier is displayed corresponding to the current wireless local area network traffic condition of the mobile terminal. The schemes can truly display the current wireless local area network traffic condition of the mobile terminal in real time, thereby improving the validity and authenticity of displaying the wireless local area network traffic and facilitating the improvement of the user experience.

4 Claims, 4 Drawing Sheets

(51) Int. Cl.
*H04W 24/08* (2009.01)
*H04W 84/12* (2009.01)

(58) Field of Classification Search
USPC .................................... 455/432.1; 709/224
See application file for complete search history.

(56) References Cited

FOREIGN PATENT DOCUMENTS

| | | |
|---|---|---|
| EP | 1394988 A2 | 3/2004 |
| JP | 2002353876 A | 12/2002 |
| JP | 2007306234 | 11/2007 |
| WO | 2012095048 A2 | 7/2012 |

OTHER PUBLICATIONS

English Abstract translation of JP2002353876 (Published Dec. 6, 2002).
English Abstract translation of CN102970769 (Published Mar. 13, 2013).
International Search Report for PCT/CN2013/077976.
EP Search Report dated Sep. 22, 2015 in corresponding application (No. 13800301.7-1854 / 2890213).

* cited by examiner

DISPLAY METHOD AND DEVICE FOR MOBILE TERMINAL

TECHNICAL FIELD

The present disclosure relates to the field of communication technology, and in particular, to a display method and apparatus for a mobile terminal.

BACKGROUND

The Wireless Local Network (WLAN for short) is a network which is built up in a certain local range using the wireless communication technology, and is a combination of the computer network and the wireless communication technology. It uses a wireless multiple access channel as a transmission medium, to provide a function of the traditional wired Local Area Network (LAN for short), thereby enabling users to casually access to the broadband network anytime and anywhere.

As The WLAN is based on the computer network and the wireless communication technology, and in the structure of the computer network, demands of the Logical Link Control (LLC for short) layer and the application layer above the LLC layer on different physical layers may be the same, or may also be different. Therefore, the standard of the WLAN is primarily for the physical layer and the Media Access Control (MAC for short) layer, and relates to the used wireless frequency range, and technical specifications and technical standards such as the air interface communication protocol etc.

The WLAN has broad development prospects in fields such as finance, tourism, health care, convention and exhibition etc. Once standards of the WLAN were firstly published, according to the existing network running conditions, the China Telecom Corporation prepares to use the WLAN to put forward the <China Telecom Corporation technical requirements of wireless Ethernet access>, and plan for the application of the WLAN in the market of the China Telecom. Then, the China Mobile Communications Corporation successively develops the <China Mobile Communications Corporation whole technical requirements of WLAN businesses>, <China Mobile Communications Corporation interface specifications of WLAN businesses>, <China Mobile Communications Corporation business specifications of WLAN businesses> etc. in combination with the existing mobile technology. It indicates that in our country, the WLAN technology will be widely applied in a large range, and will certainly present a trend of rapid rise, which will create many new business development opportunities.

At present, many users are accustomed to use the WLAN to surf the Internet, but many users usually complain that the signal strength of the WLAN icon on the home screen is full, but the speed of surfing the Internet is very slow. This case is mainly due to the signal strength of the WLAN icon on the home screen cannot reflect the real traffic condition, which seriously influences the user experience.

There is currently no effective solution proposed to solve at least one of the above problems in the related technology.

SUMMARY

The embodiments of the present invention provide a display method and apparatus of a mobile terminal, which can present the real traffic condition to the user of the mobile terminal who surfs the Internet using the WLAN.

The embodiment of the present invention provides a display method for a mobile terminal, comprising: setting traffic display identifiers corresponding to different wireless local area network traffic conditions of the mobile terminal; and displaying a traffic display identifier corresponding to the current wireless local area network traffic condition of the mobile terminal.

Preferably, the type of the traffic display identifier comprises at least one of a color identifier and an icon identifier.

Preferably, the display method further comprises: before displaying the traffic display identifier corresponding to the current wireless local area network traffic condition of the mobile terminal, acquiring the current wireless local area network traffic condition of the mobile terminal by the following steps: receiving the current wireless local area network traffic condition allocated to the mobile terminal and notified by a wireless local area network hotspot module; and/or inquiring the current wireless local area network traffic condition allocated by the wireless local area network hotspot module to the mobile terminal in intervals of a preset period.

Preferably, acquiring the current wireless local area network traffic condition of the mobile terminal comprises: when establishing a connection with the wireless local area network hotspot, acquiring the current wireless local area network traffic condition of the mobile terminal according to wireless resource information applied by the mobile terminal.

Preferably, acquiring the current wireless local area network traffic condition of the mobile terminal comprises: in a condition that wireless resource between the wireless local area network hotspot and a network module changes, acquiring the current wireless local area network traffic condition allocated by the wireless local area network hotspot module to the mobile terminal.

The embodiment of the present invention further provides a mobile terminal, comprising a processor, configured to:
set traffic display identifiers corresponding to different wireless local area network traffic conditions of the mobile terminal, and
display a traffic display identifier corresponding to a current wireless local area network traffic condition of the mobile terminal;
wherein the traffic display Identifier comprises a WLAN icon which shows different colors for different traffic conditions;
the processor Is further configured to:
when the mobile terminal establishes a connection with a WLAN hotspot, display a color of the WLAN icon dynamically according to wireless resource information applied by the mobile terminal;
when the wireless resource changes, dynamically display the color of the WLAN icon;
when the WLAN hotspot perceives a change of wireless resource between the WLAN hotspot and a network module, receive a notification of a current wireless resource condition from the WLAN hotspot, and dynamically display the color of the WLAN icon to display the wireless local area network traffic condition.

Wherein, the processor is further configured to:
receive the current wireless local area network traffic condition allocated to the mobile terminal and notified by a wireless local area network hotspot module; and/or
Inquire, in Intervals of a preset period, the current wireless local area network traffic condition allocated by the wireless local area network hotspot module to the mobile terminal.

The embodiment of the present invention provides a mobile terminal, comprising: the display system of any of the mobile terminals.

In the embodiments of the present invention, firstly, traffic display identifiers corresponding to different wireless local area network traffic conditions of the mobile terminal are set; and then a traffic display identifier corresponding to the current wireless local area network traffic condition of the mobile terminal is displayed, which can truly display the current wireless local area network traffic condition of the mobile terminal in real time, thereby improving the validity and authenticity of displaying the wireless local area network traffic and facilitating the improvement of the user experience.

BRIEF DESCRIPTION OF DRAWINGS

The accompanying drawings described herein are used to provide a better understanding of the present disclosure and constitute a part of this application, and the schematic embodiments of the present disclosure and the descriptions thereof are used to explain the present disclosure and do not constitute an improper definition of the present disclosure. In the accompanying drawings.

PREFERRED EMBODIMENTS OF THE PRESENT INVENTION

The present disclosure will be illustrated in detail hereinafter with reference to accompanying drawings and in combination with embodiments. It should be illustrated that in the case of no conflict, the embodiments of this application and the features in the embodiments could be combined randomly with each other.

Figure 1:
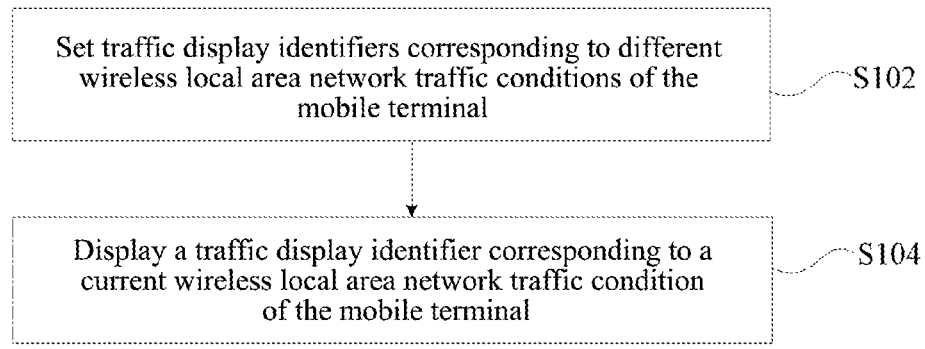
FIG. 1 is a flowchart of a display method of a mobile terminal according to an embodiment of the present invention.

The present embodiment provides a display method of a mobile terminal. As shown in FIG. 1, the method comprises step S102 to step S104.

In step S102, traffic display identifiers corresponding to different wireless local area network traffic conditions of the mobile terminal are set.

In step S104, a traffic display identifier corresponding to a current wireless local area network traffic condition of the mobile terminal is displayed.

Through the above steps, firstly, the traffic display identifiers corresponding to the different wireless local area network traffic conditions of the mobile terminal are set. For example, the different wireless local area network traffic conditions correspond to different colors, or the different wireless local area network traffic conditions correspond to different icons. Then, a traffic display identifier corresponding to a current wireless local area network traffic condition of the mobile terminal is displayed. This can truly display the current wireless local area network traffic condition of the mobile terminal in real time, thereby improving the validity and authenticity of displaying the wireless local area network traffic and facilitating the improvement of the user experience.

In order to improve the vividness of displaying the wireless local area network traffic condition, in the preferable embodiment, the types of the traffic display identifiers above may comprise at least one of a color identifier and an icon identifier. I.e., it may choose to display the current wireless local area network traffic condition racily and vividly through different traffic display identifiers so that a user can judge the current wireless local area network traffic condition. For example, when the types of the above traffic display identifiers are the color identifiers, the different wireless local area network traffic conditions may be displayed through different colors. For examples, when the traffic is below 200 K/S, the user may set the identifier as red, when the traffic is greater than or equal to 200-300 K/S, the user may set the identifier as blue, and when the traffic is greater than or equal to 1 M/S, the user may set the identifier as green. Preferably, the specific color, and a corresponding relationship between the specific color and traffic (corresponding to the wireless local area network traffic condition) may be selected by the user freely according to personal habits, and hobbies, or may be set by default by vendors. Of course, icon identifiers corresponding to the traffics may also be set to display different wireless local area network traffic conditions, thereby improving enjoyment while improving the vividness of displaying the wireless local area network traffic condition.

In order to accurately display the current wireless local area network traffic condition in real time, in the preferable embodiment, before displaying a traffic display identifier corresponding to the current wireless local area network traffic condition of the mobile terminal, the display method of the mobile terminal further comprises: acquiring the current wireless local area network traffic condition of the mobile terminal by the following steps: receiving the current wireless local area network traffic condition allocated to the mobile terminal and notified by a wireless local area network hotspot module; and/or, inquiring the current wireless local area network traffic condition allocated by the wireless local area network hotspot module to the mobile terminal in intervals of a preset period. I.e., the accurate wireless local area network traffic condition is acquired in different manners in real time for display, so that the user can accurately judge conditions such as the current speed for surfing the Internet and etc. according to the actual current wireless local area network traffic condition, and improve the user experience.

Figure 5:
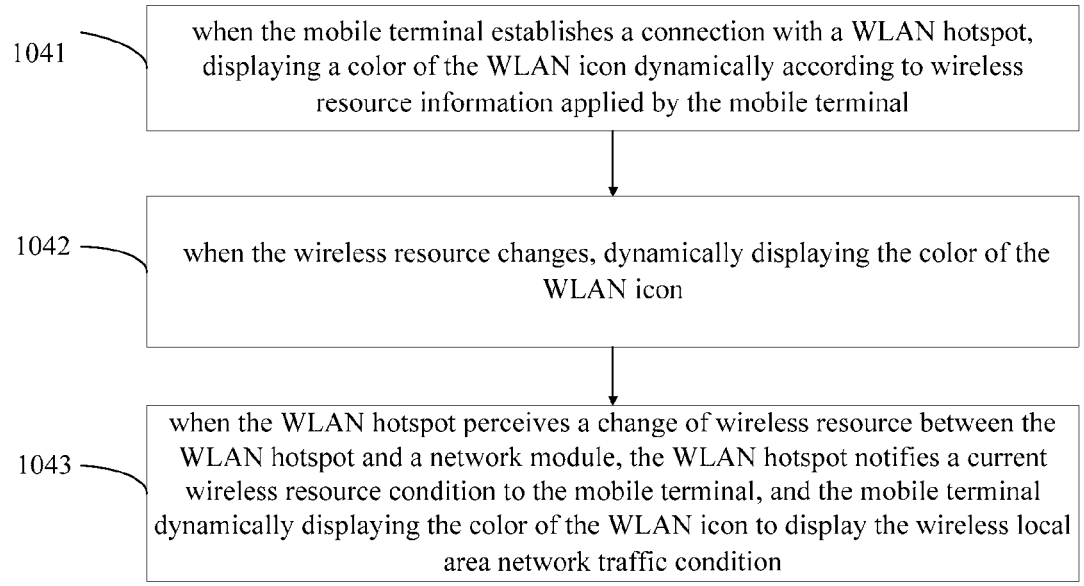
FIG. 5 is a display method for the mobile terminal.

As shown in FIG. 5, the step S104 can be implemented by the following steps.

Step 1041, when the mobile terminal establishes a connection with a WLAN hotspot, displaying a color of the WLAN icon dynamically according to wireless resource information applied by the mobile terminal.

Step 1042, when the wireless resource changes, dynamically displaying the color of the WLAN icon.

Step 1043, when the WLAN hotspot perceives a change of wireless resource between the WLAN hotspot and a network module, the WLAN hotspot notifies a current wireless resource condition to the mobile terminal, and the mobile terminal dynamically displaying the color of the WLAN icon to display the wireless local area network traffic condition.

In order to meet the requirements of different application scenarios, and improve the flexibility of the preferable embodiment, in the preferable embodiment, acquiring the current wireless local area network traffic condition of the mobile terminal comprises: when establishing a connection with the wireless local area network hotspot, acquiring the current wireless local area network traffic condition of the mobile terminal according to wireless resource information applied by the mobile terminal.

Acquiring the current wireless local area network traffic condition of the mobile terminal further comprises: acquiring the current wireless local area network traffic condition allocated by the wireless local area network hotspot module to the mobile terminal in a condition that wireless resource between the wireless local area network hotspot module and a network module changes.

Figure 2:
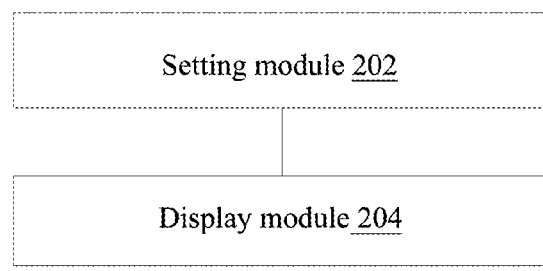
FIG. 2 is a structural block diagram of a display system of a mobile terminal according to an embodiment of the present invention.

The preferable embodiment provides a process display system of a mobile terminal, as shown in FIG. 2, comprising: a setting module 202, configured to set traffic display identifiers corresponding to different wireless local area network traffic conditions of the mobile terminal; and a display module 204 connected to the setting module 202, and configured to display a traffic display identifier corresponding to the current wireless local area network traffic condition of the mobile terminal.

In the above preferable embodiment, firstly, the setting module 202 sets traffic display identifiers corresponding to different wireless local area network traffic conditions of the mobile terminal. For example, the different wireless local area network traffic conditions correspond to different colors, or the different wireless local area network traffic conditions correspond to different icons. Then, the display module 204 displays a traffic display identifier corresponding to a current wireless local area network traffic condition of the mobile terminal. This can truly display the current wireless local area network traffic condition of the mobile terminal in real time, thereby improving the validity and authenticity of displaying the wireless local area network traffic and facilitating the improvement of the user experience.

In order to improve the vividness of displaying the wireless local area network traffic condition, in the preferable embodiment, the types of the traffic display identifiers above may comprise at least one of a color identifier and an icon identifier.

Figure 3:
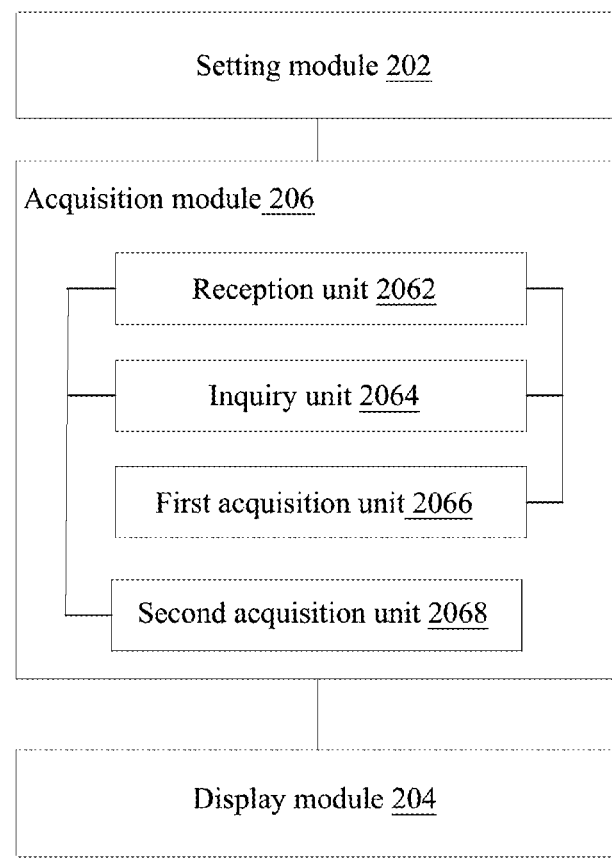
FIG. 3 is a structural block diagram of an acquisition module according to an embodiment of the present invention.

In order to accurately display the current wireless local area network traffic condition in real time, in the preferable embodiment, as shown in FIG. 3, the traffic display system further comprises: an acquisition module 206, configured to acquire the current wireless local area network traffic condition of the mobile terminal, wherein, the above acquisition module 206 comprises: a reception unit 2062 and/or an inquiry unit 2064; the reception unit 2062 is configured to receive the current wireless local area network traffic condition allocated to the mobile terminal and notified by a wireless local area network hotspot module; and the inquiry unit 2064 is configured to inquire the current wireless local area network traffic condition allocated by the wireless local area network hotspot module to the mobile terminal in intervals of a preset period.

In order to meet the requirements of different application scenarios, and improve the flexibility of the preferable embodiment, in the preferable embodiment, as shown in FIG. 3, the above acquisition module 206 further comprises: a first acquisition module 2066 and/or a second acquisition module 2068;

the first acquisition module 2066 is connected to the reception unit 2062 and the inquiry unit 2064, and is configured to acquire the current wireless local area network traffic condition of the mobile terminal according to wireless resource information applied by the mobile terminal when establishing a connection with the wireless local area network hotspot, and the second acquisition module 2068 is connected to the reception unit 2062 and the inquiry unit 2064, and is configured to acquire the current wireless local area network traffic condition allocated by the wireless local area network hotspot module to the mobile terminal in a condition that wireless resource between the wireless local area network hotspot module and a network module changes.

Preferably, the above traffic display system can be applied in the mobile terminal; and the user can judge conditions such as the current speed for surfing the Internet and etc. of the mobile terminal conveniently and clearly through effectively displaying the current wireless local area network traffic condition of the mobile terminal in real time, thereby improving the practicability of the mobile terminal and the user experience.

Various preferable embodiments above will be described in detail below in conjunction with accompanying drawings.

Figure 4:
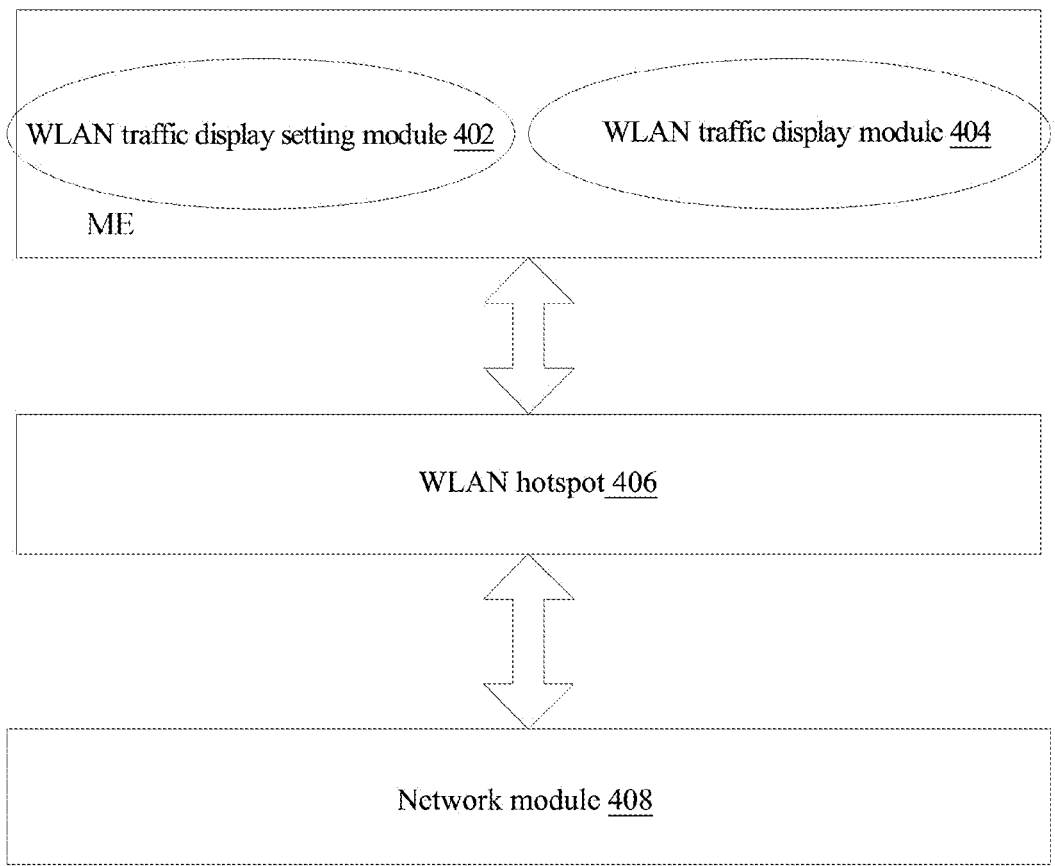
FIG. 4 is a structural block diagram of a traffic display system according to an embodiment of the present invention.

In the preferable embodiment, the mobile phone being the mobile terminal is taken as example. FIG. 4 is a structural block diagram of a traffic display system of a mobile terminal according to an embodiment of the present invention. The traffic display system may interact with a WLAN hotspot module 406, as shown in FIG. 4, and comprises:

a WLAN traffic display setting module 402 (corresponding to the above setting module 202), configured to set the corresponding relationship between the different traffic display identifiers and the different wireless local area network traffic conditions to achieve displaying the corresponding traffic display identifiers according to the different wireless local area network traffic conditions. Preferably, types of the traffic display identifiers comprise at least one of a color identifier and an icon identifier. I.e., it may choose to display the current wireless local area network traffic condition racily and vividly through different traffic display identifiers so that a user can judge the current wireless local area network traffic condition. For example, when the types of the above traffic display identifiers are the color identifiers, the different wireless local area network traffic conditions may be displayed through different colors. For examples, when the traffic is below 200 K/S, the user may set the identifier as red, when the traffic is greater than or equal to 200-300 K/S, the user may set the identifier as blue, and when the traffic is greater than or equal to 1 M/S, the user may set the identifier as green. Preferably, the specific color, and a corresponding relationship between the specific color and the wireless local area network traffic condition may be selected by the user freely according to personal habits, and hobbies, or may be set by default by vendors. Of course, icon identifiers corresponding to the wireless local area network traffic conditions may also be set to display different wireless local area network traffic conditions, thereby improving enjoyment while improving the vividness of displaying the wireless local area network traffic condition;

a WLAN traffic display module 404 (corresponding to the above display module 204), configured to dynamically change the color or pattern of the WLAN icon on the home screen in real time through the preset traffic display identifiers such as colors or patterns etc. according to the current wireless local area network traffic condition. Preferably, the WLAN traffic display module 404 can be set in the mobile terminal.

Preferably, the WLAN traffic display module 404 can display the current wireless local area network traffic condition under at least one of the following conditions:

1): when the mobile terminal establishes a connection with the WLAN hotspot, the color or pattern of the WLAN icon on the WLAN home screen is displayed dynamically according to the wireless resource information applied by the mobile terminal.

2): When the wireless resource changes, the mobile terminal dynamically displays the color or pattern of the WLAN icon on the current WLAN home screen.

3): When the WLAN hotspot perceives the change of wireless resource between the WLAN hotspot module and a network module, a WLAN hotspot module 406 notifies the current wireless resource condition to the mobile terminal, and the WLAN traffic display module 404 in the mobile terminal dynamically displays the color or pattern of the WLAN icon on the WLAN home screen, to display the wireless local area network traffic condition which is currently allocated to the mobile terminal;

the WLAN hotspot module 406, comprising the basic function of the WLAN spot. It manages the wireless resource of the mobile terminal which accesses and notifies the mobile terminal when the wireless resource between a network module and itself changes.

a network module 408, comprising the basic function of the current network module, and primarily representing the Internet network connected to the WLAN.

It can be seen from the above description that the above preferable embodiment achieves the following technical effects: firstly, the current wireless local area network traffic condition of the mobile terminal is acquired, and then, corresponding traffic display identifiers are displayed according to different wireless local area network traffic conditions. This can truly display the current wireless local area network traffic condition of the mobile terminal in real time, thereby improving the validity and authenticity of displaying the wireless local area network traffic and facilitating the improvement of the user experience.

Figure 6:
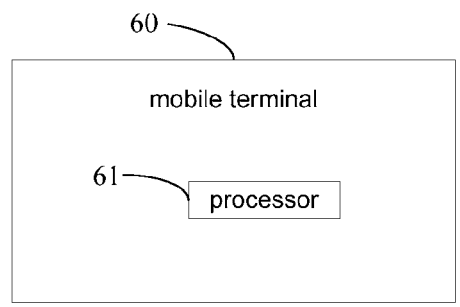
FIG. 6 is the mobile terminal.

Another embodiment provides a mobile terminal 60, as shown in FIG. 6, comprising a processor 61, configured to:

set traffic display identifiers corresponding to different wireless local area network traffic conditions of the mobile terminal, and display a traffic display identifier corresponding to a current wireless local area network traffic condition of the mobile terminal;

wherein the traffic display identifier comprises a WLAN Icon which shows different colors for different traffic conditions.

The processor 61 is further configured to:

when the mobile terminal establishes a connection with a WLAN hotspot, display a color of the WLAN icon dynamically according to wireless resource Information applied by the mobile terminal;

when the wireless resource changes, dynamically display the color of the WLAN icon;

when the WLAN hotspot perceives a change of wireless resource between the WLAN hotspot and a network module, receive a notification of a current wireless resource condition from the WLAN hotspot, and dynamically display the color of the WLAN icon to display the wireless local area network traffic condition.

The processor 61 is further configured to: receive the current wireless local area network traffic condition allocated to the mobile terminal and notified by a wireless local area network hotspot module; and/or inquire, in Intervals of a preset period, the current wireless local area network traffic condition allocated by the wireless local area network hotspot module to the mobile terminal.

Obviously, those skilled in the art should understand that each module or each step of the aforementioned present disclosure can be implemented with general computing devices, and can be integrated in a single computing device, or distributed onto a network consisting of a plurality of computing devices; alternatively, they can be implemented with program codes executable by the computing devices, and therefore, they can be stored in storage devices to be executed by the computing devices, and in some cases, the steps illustrated or described may be performed in an order different from that described here; alternatively, they are respectively made into a plurality of integrated circuit modules; alternatively, it is implemented with making several modules or steps of them into a single integrated circuit module. Thus, the present disclosure is not limited to any specific combinations of hardware and software.

The above description is only a preferred embodiment of the present invention and is not intended to limit the present disclosure. For those skilled in the art, the present disclosure may have various changes and variations. Any modification, equivalent substitution and improvement made within the spirit and principle of the present disclosure should be included within the protection scope of the present disclosure.

INDUSTRIAL APPLICABILITY

In the display method and apparatus of the mobile terminal according to the embodiments of the present disclosure, firstly, traffic display identifiers corresponding to different wireless local area network traffic conditions of the mobile terminal are set; and then a traffic display identifier corresponding to the current wireless local area network traffic condition of the mobile terminal is displayed. The present apparatus can truly display the current wireless local area network traffic condition of the mobile terminal in real time, thereby improving the validity and authenticity of displaying the wireless local area network traffic and facilitating the improvement of the user experience.

What is claimed is:

1. A display method for a mobile terminal, comprising:
setting by the mobile terminal traffic display identifiers corresponding to different wireless local area network traffic conditions of the mobile terminal; and
the mobile terminal displaying a traffic display identifier corresponding to a current wireless local area network traffic condition of the mobile terminal;
wherein the traffic display identifier comprises a WLAN icon which shows different colors for different traffic conditions;
wherein the mobile terminal displaying a traffic display identifier corresponding to a current wireless local area network traffic condition of the mobile terminal comprises:
when the mobile terminal establishes a connection with a WLAN hotspot, displaying a color of the WLAN icon dynamically according to wireless resource information applied by the mobile terminal;
when the wireless resource changes, dynamically displaying the color of the WLAN icon;
when the WLAN hotspot perceives a change of wireless resource between the WLAN hotspot and a network module, the WLAN hotspot notifies a current wireless resource condition to the mobile terminal, and the mobile terminal dynamically displaying the color of the WLAN icon to display the wireless local area network traffic condition.

2. The method according to claim 1, further comprising:

before displaying the traffic display identifier corresponding to the current wireless local area network traffic condition of the mobile terminal, acquiring the current wireless local area network traffic condition of the mobile terminal by the following steps:

receiving the current wireless local area network traffic condition allocated to the mobile terminal and notified by a wireless local area network hotspot; and/or inquiring, in intervals of a preset period, the current wireless local area network traffic condition allocated by the wireless local area network hotspot to the mobile terminal.

3. A mobile terminal, comprising a processor, configured to:

set traffic display identifiers corresponding to different wireless local area network traffic conditions of the mobile terminal, and display a traffic display identifier corresponding to a current wireless local area network traffic condition of the mobile terminal by a displayer on a screen;

wherein the traffic display identifier comprises a WLAN icon which shows different colors for different traffic conditions;

the processor is further configured to:

when the mobile terminal establishes a connection with a WLAN hotspot, display a color of the WLAN icon dynamically by the displayer according to wireless resource information applied by the mobile terminal;

when the wireless resource changes, dynamically display the color of the WLAN icon by the displayer;

when the WLAN hotspot perceives a change of wireless resource between the WLAN hotspot and a network module, receive a notification of a current wireless resource condition from the WLAN hotspot by a receiver, and dynamically display the color of the WLAN icon by the displayer to display the wireless local area network traffic condition.

4. The display system according to claim 3, in which the processor is further configured to:

receive the current wireless local area network traffic condition allocated to the mobile terminal and notified by a wireless local area network hotspot module by the receiver; and/or inquire, in intervals of a preset period, the current wireless local area network traffic condition allocated by the wireless local area network hotspot module to the mobile terminal.

* * * * *